(12) United States Patent
Angel

(10) Patent No.: US 6,378,186 B1
(45) Date of Patent: Apr. 30, 2002

(54) AUTOMOBILE FRAMING SYSTEM

(75) Inventor: Jeffrey R. Angel, Oxford, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 08/853,544

(22) Filed: May 9, 1997

Related U.S. Application Data (60) Continuation of application No. 08/344,116, filed on Nov. 23, 1994, now abandoned, which is a division of application No. 08/088,839, filed on Jul. 8, 1993, now Pat. No. 5,409,158.

(51) Int. Cl.[7] ............................................. B25B 27/14
(52) U.S. Cl. ........................ 29/281.1; 29/281.5; 29/822
(58) Field of Search ...................... 29/430, 799, 822, 29/281.1, 281.4, 281.5; 228/182, 212, 4.1, 49.1; 269/56, 287

(56) References Cited

U.S. PATENT DOCUMENTS

| | | | |
|---|---|---|---|
| 4,162,387 A | | 7/1979 | De Candia |
| 4,256,947 A | | 3/1981 | De Candia |
| 4,404,451 A | | 9/1983 | Niikawa et al. |
| 4,442,235 A | | 4/1984 | Rossi |
| 4,483,476 A | | 11/1984 | Fujikawa et al. |
| 4,494,687 A | | 1/1985 | Rossi |
| 4,538,044 A | * | 8/1985 | Kadowaki et al. ............. 219/80 |
| 4,573,626 A | | 3/1986 | Nishiyama |
| 4,600,136 A | | 7/1986 | Sciaky et al. |
| 4,606,488 A | | 8/1986 | Yanagisawa |
| 4,659,895 A | | 4/1987 | Di Rosa |
| 4,667,866 A | | 5/1987 | Tobita et al. |
| 4,670,961 A | * | 6/1987 | Fontaine et al. ............... 29/823 |
| 4,675,969 A | | 6/1987 | Sciaky et al. |
| 4,678,110 A | | 7/1987 | Handa |
| 4,682,722 A | | 7/1987 | Bossotto et al. |
| 4,719,328 A | | 1/1988 | Yanagisawa et al. |
| 4,751,995 A | | 6/1988 | Naruse et al. |
| 4,776,084 A | | 10/1988 | Naruse et al. |
| 4,779,787 A | | 10/1988 | Naruse et al. |
| 4,800,249 A | | 1/1989 | Di Rosa |
| 4,802,616 A | | 2/1989 | Naruse et al. |
| 4,905,884 A | | 3/1990 | Alborante et al. |
| 5,011,068 A | * | 4/1991 | Stoutenburg et al. ......... 228/4.1 |
| 5,093,977 A | * | 3/1992 | Muller et al. .................. 29/791 |
| 5,104,033 A | | 4/1992 | Tanake et al. |
| 5,111,988 A | | 5/1992 | Strickland |
| 5,123,161 A | | 6/1992 | Kubo et al. |
| 5,184,766 A | | 2/1993 | Takahaski et al. |
| 5,265,317 A | | 11/1993 | Angel |
| 5,479,698 A | * | 1/1996 | Angel .......................... 29/822 |

FOREIGN PATENT DOCUMENTS

| | | | | |
|---|---|---|---|---|
| GB | 2185942 | * | 8/1987 | .................. 29/791 |

* cited by examiner

Primary Examiner—David P. Bryant
(74) Attorney, Agent, or Firm—Young & Basile, P.C.

(57) ABSTRACT

A framing system and framing device for assembling and welding a body-in-white. The framing system utilizes completely separate framing and welding operations, which are typically intermixed in conventional framing systems. The framing device is a unitary frame structure within which an underbody, side frames and other body components can each be supported and accurately positioned with respect to each other prior to the welding operation. The framing device includes a cart which serves as the base and main support for the framing device, and an upper body support member. Using an appropriate number of clamping devices, the net positions of the body components which constitute the body-in-white are properly established and maintained, such that gate fixtures are unnecessary during the welding operation. The structure of the framing device provides considerable access to the body-in-white supported within the interior of the framing device, such that a greater number of welding guns can be used during the welding operation. As a result, essentially all of the welds necessary to achieve and maintain the rigidity and geometry of the body-in-white can be formed during a single welding operation.

14 Claims, 3 Drawing Sheets

AUTOMOBILE FRAMING SYSTEM

This is a continuation, of application Ser. No. 08/344,116, filed Nov. 23, 1994 abandoned which is a division, of application Ser. No. 08/088,839, filed Jul. 8, 1993, now U.S. Pat. No. 5,409,158 issued Apr. 29, 1995.

BACKGROUND OF THE INVENTION

1. Field of the Invention

The present invention generally relates to body framing Systems for the assembly and welding of automobile bodies. More specifically, this invention relates to an automobile framing method and apparatus which enables the components of an automobile body to be loaded, positioned and welded in place, all within a single framing structure, such that the complexity of the assembly operation is reduced, and progressive series of positioning and welding operations are unnecessary.

2. Description of the Prior Art

In the manufacturing of automobiles and trucks, body frames, which typically consist of at least an underbody, a pair of side frames, and front and rear headers, conventionally undergo a progressive series of positioning and welding steps before a structurally rigid body frame, termed a body-in-white, is produced. Though bodies are still manually assembled and welded, emphasis on automated assembly and welding operations has generated numerous automated and semi-automated framing systems.

Typically, framing systems which involve a degree of automation include the operations of (1) locating the components relative to each other on the underbody, (2) performing an initial pretack weld to "toy tab" the components together, (3) transporting the toy tabbed body to a "framing" welding station, (4) accurately establishing within a framing station the desired final geometry of all of the components of the body-in-white by laterally engaging the toy tabbed components with locating frames, often termed gate fixtures, (5) performing additional weld operations within the framing station to more permanently and securely weld the components together to accurately form the body-in-white, and then (6) transporting the body-in-white to a final welding, or respot, station where the remaining welds (the welds which, for whatever reason, could not be made in the framing station) are made to establish a structurally rigid body frame.

Though many variations of the above process are known, it is the general object of each framing system to accurately locate the body components relative to each other (establish a net location) and maintain the net location position throughout the later welding operations, until the structural rigidity of the body-in-white is sufficient to preserve the desired geometric configuration throughout the assembly line. A further object for most framing systems is to provide sufficient flexibility to accommodate more than one body style, so as to enhance the versatility of the assembly line and reduce the tooling cost per assembly unit.

As an illustration of the above, U.S. Pat. No. 4,162,387 to De Candia teaches a framing system which includes a framing station equipped with a transfer system for transporting a number of pallets through the framing station. Each pallet is equipped to support and locate an underbody subassembly which has been toy tabbed to apertures and various other body panels. Once at the framing station, the toy tabbed body is engaged with at least one pair of gate fixtures, each having clamps for holding the toy tabbed body so as to establish the final geometry of the body-in-white. More than two pairs of gate fixtures are present at the framing station, each pair being adapted to a particular body style. As a result, different body styles can be welded at the same framing station. Programmable robots are located at the framing station, each of which is provided with a welding gun to perform spot welding of the body-in-white, in accordance with the particular requirements of each different body style.

Since the programming robots must pass through the clamping frame, access to the body-in-white for welding all areas is limited and therefore this arrangement often results in the performance of only a portion of the required welds at the framing station and the partially welded subassembly of the body-in-white must be advanced to a second (respot) station where the final welding operation is performed. The respot station utilizes a different clamping frame to allow access of welding heads to the portions of the subassembly which could not be accessed in the first framing station. Therefore, respot operation is necessary with conventional framing systems because the gate fixtures and their associated transfer systems significantly limit access to the body-in-white within the framing station. In addition, the time required to operate the gate fixtures for each successive body-in-white, as well as the time required to interchange gate fixtures to accommodate different body styles, significantly reduces the amount of time within the assembly cycle which is available to perform the welding operation, while still sustaining a through-put rate compatible with prior and subsequent assembly operations.

Various attempts have been made to provide greater clearance to access the body-in-white in order to improve the efficiency of the welding operation and avoid a respot welding. For example, in U.S. Pat. No. 4,670,961, front and rear clamping frames are carried by rotary magazines located in position above the front and rear portions of the body-in-white. The clamping frames are located above the body-in-white and are pivotable to lower them into an operating position overlying the body-in-white in order to clamp the various panels associated with the welding operation. This arrangement does, indeed, provide more access from the sides to the various panels to be welded. However, the locating system described requires two independent clamping frames to be employed at opposite sides of the vehicle which necessitates that the two separate frames be independently located relative to the body and to each other. Clearly, this arrangement, although providing cleaner access, has some built-in inaccuracies in that the separate frames must be independently located relative to the body and to each other thereby resulting in additional tolerance limitations to be taken into consideration which affect the final tolerances of the assembled body. Also, this arrangement increases the potential for downtime of the assembly line as well as occupies significant floor space resulting in additional costs and slower cycle times.

Further attempts have been made to provide greater access to the body-in-white for welding by relocating the tooling which positions the body so that the tooling moves vertically and avoids any interference with the welding robots located on either side of the framing stations such as the example shown in Sciaky et al, U.S. Pat. No. 4,675,969.

From the above, it can be seen that a significant disadvantage with current framing systems is the requirement for successive welding operations as a result of the methods adopted to establish and preserve the final geometry of the body-in-white. Each successive welding operation not only requires its own dedicated welding guns, but also involves an entirely separate station on the factory floor, each of which occupies valuable floor space resulting in significant costs associated with tooling and plant facilities. Furthermore, successive framing and welding operations undesirably increase the overall cycle time for producing a body-in-white.

Another disadvantage with conventional framing systems is the toy tabbing operation noted above, in which the underbody and other body components are welded together to the extent necessary to position the components in relation to each other, so that the gate fixtures are subsequently capable of establishing the final geometry of the body-in-white. The toy tabbing operation may be automated to some degree, but typically results in a flexible structure which will collapse, or "match box", if not properly engaged by the gate fixtures. Furthermore, any geometric inaccuracies resulting from the toy tabbing process necessitates that, at the framing station, the gate fixtures must physically overwhelm the toy tabbed structure to precisely establish the desired geometry of the body-in-white.

A further disadvantage of conventional automated and semi-automated framing systems is the use of gate fixtures. The level of automation required with the use of gate fixtures complicates the layout and operation of the framing station, thus increasing the potential for downtime on the assembly line. Automated systems which are employed to selectively transfer gate fixtures to and from the framing station to accommodate different body styles occupy additional floor space, which further limits access to the body-in-white for welding, while also increasing the potential for downtime. Gate fixtures and their required accessories also limit the ability to use visual systems to analyze the geometry of the body-in-white prior to welding.

From the above discussion, it can be readily appreciated that the prior art does not disclose a framing system which separates the framing and welding operations into two distinct operations. Nor does the prior art teach a framing system by which the final geometry of a body-in-white can be established prior to welding, so as to avoid the use of gate fixtures during the welding operation. In addition, the prior art does not teach or suggest a framing system which entails the use of a single welding operation, so as to eliminate the conventional requirement for successive toy tabbing, welding and respot welding operations.

Accordingly, what is needed is a framing system which employs a framing device that enables a vehicle's body components to be accurately positioned and maintained relative to each other within the framing device, such that the entire framing device can be transported to a single framing/welding station at which all necessary welding can be performed on the body-in-white, whereby the framing system eliminates the practice of toy tabbing and respot welding, and eliminates the need for gate fixtures during the welding operation.

SUMMARY OF THE INVENTION

According to the present invention there is provided a framing system and a framing device for the assembly of a body-in-white. The framing device is structured to enable the final net positions of the individual components of the body-in-white to be established and maintained, such that the entire framing device can be transported from a loading station to a framing/welding station, at which all welding operations necessary to establish a structurally rigid body-in-white can be performed.

The framing device is composed of two support members, the first of which supports the underbody while the second primarily supports and locates the upper body members of the body-in-white, such as the side frames, front and rear headers, roof or roof bows, and the like, relative to the underbody. The framing device is also structured to optimize access to the body-in-white, such that a relatively large number of welding guns can be positioned to produce the required number of welds necessary to permanently and rigidly establish the final geometry of the body-in-white. Accordingly, the framing system of this invention eliminates the requirement for toy tabbing the body-in-white prior to framing, and further eliminates the need for maneuverable gate fixtures during the welding operation.

The first and second support members of the framing device are preferably selectively engagable with each other to promote interchangeability and, therefore, flexibility of the framing system. The support members are provided with corresponding locating members such that their established relative position to each other accurately establishes the necessary net positions of the individual body components of the body-in-white. Together, the first and second support members define a unitary frame structure which is suitable for transporting the body-in-white to and from a framing/welding station, at which the welding operation is performed.

Consequently, it is an advantage of this invention that the individual body components can be accurately located in relation to each other by the framing device, such that the body components can be welded together to form a unitary body-in-white while being supported by and within the framing device. Consequently, a toy tabbing operation is unnecessary, and the requirement for gate fixtures is eliminated.

According to a preferred aspect of this invention, the framing device facilitates a framing system which is simplified, occupies less floor space, and has the potential for significantly less downtime as a result of fewer automated systems being required for fewer assembly stations. The framing method made possible by the framing device of this invention generally includes delivering the framing device to a loading station, at which an underbody is loaded onto the first support member of the framing device, such that the underbody is supported and positionally located in relation to the framing device. Typically two or more upper body members, such as the side frames and front and rear headers of the body-in-white, will then be located with the first and second support member such that these components are supported and positionally located in relation to the underbody. Each of the body components are secured to one or both of the first and second support members in a manner which ensures that the net positions of the body components will not be disturbed while the framing device is transferred from the loading station to a framing/welding station. At the framing/welding station, the body components are welded together such that the resulting body-in-white is structurally rigid and the desired final geometry of the body-in-white is established.

A significant advantage of the framing system enabled by the present invention is that toy tabs and respot welding operations are completely eliminated. Framing of the body-in-white occurs entirely at the loading station when the individual body components are positioned within the framing device. Afterwards, the entire framing device with the supported body components is transferred to a framing/welding station, at which time essentially all of the welds necessary to establish and maintain the desired final geometry of the body-in-white are formed. Sequential welding operations are not required.

Another significant advantage of this invention is that the use of conventional gate fixtures is completely eliminated, resulting in significantly improved access to the body-in-white for the welding guns and their associated robots during the welding operation. In addition, the conventional transfer system otherwise required to retrieve and return the gate fixtures specifically designed for different body styles is also eliminated, which significantly reduces the complexity and, therefore, the maintainability of the framing and welding operations.

Accordingly, it is an object of the present invention to provide a framing system for the assembly of a body-in-white which enables the body-in-white to be welded by a single welding operation.

It is a further object of the invention that the framing system achieve the above by employing a framing device which can positionally locate and support the individual components of the body-in-white relative to each other, so as to establish the final geometry of the body-in-white prior to the welding operation.

It is still a further object of the invention that the framing system include a loading operation by which the individual components of the body-in-white are positioned relative to each other within the framing device, and a separate welding operation in which essentially all of the welds necessary to achieve and maintain the rigidity and geometry of the body-in-white are formed.

It is another object of the invention that the framing system eliminates the requirement for automated gate fixtures for the purpose of establishing and maintaining the desired geometry of the body-in-white during the welding operation.

It is yet another object of the invention that the framing device be capable of providing sufficient access to the body-in-white so as to promote the number of welds which can be simultaneously performed, such that the overall cycle time for assembling the body-in-white is minimized.

It is still another object of the invention that the framing system be flexible in terms of accommodating more than one body style in a single assembly line, readily adaptable to introducing new body styles to the assembly line, and relatively uncomplicated so as to enhance the maintainability of the equipment employed within the framing system.

Other objects and advantages of this invention will be more apparent after a reading of the following detailed description taken in conjunction with the drawings provided.

DETAILED DESCRIPTION OF THE PREFERRED EMBODIMENT

Figure 1:
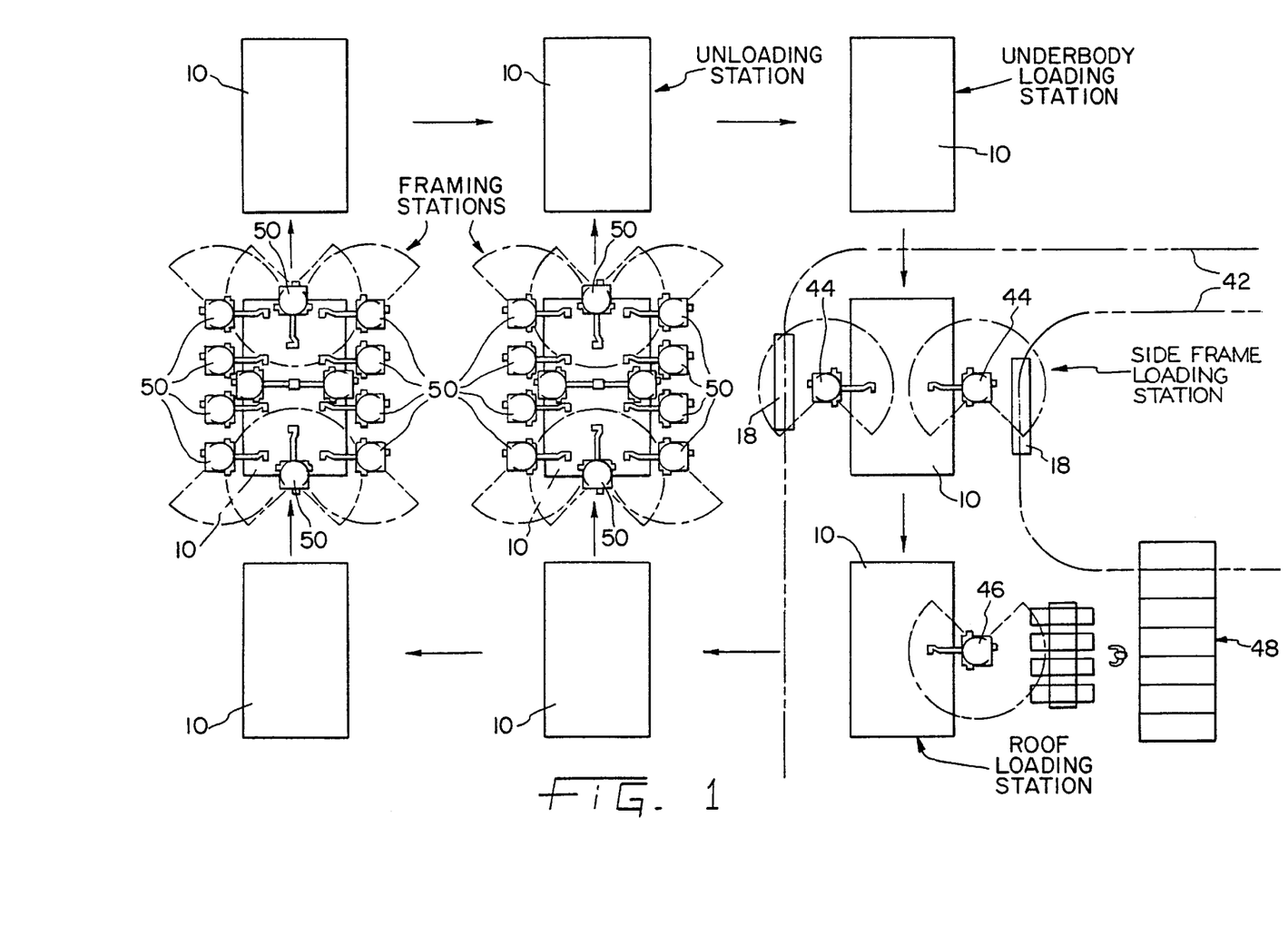
FIG. 1 is a schematic plan view of a framing system in accordance with a preferred embodiment of this invention.
Figure 2:
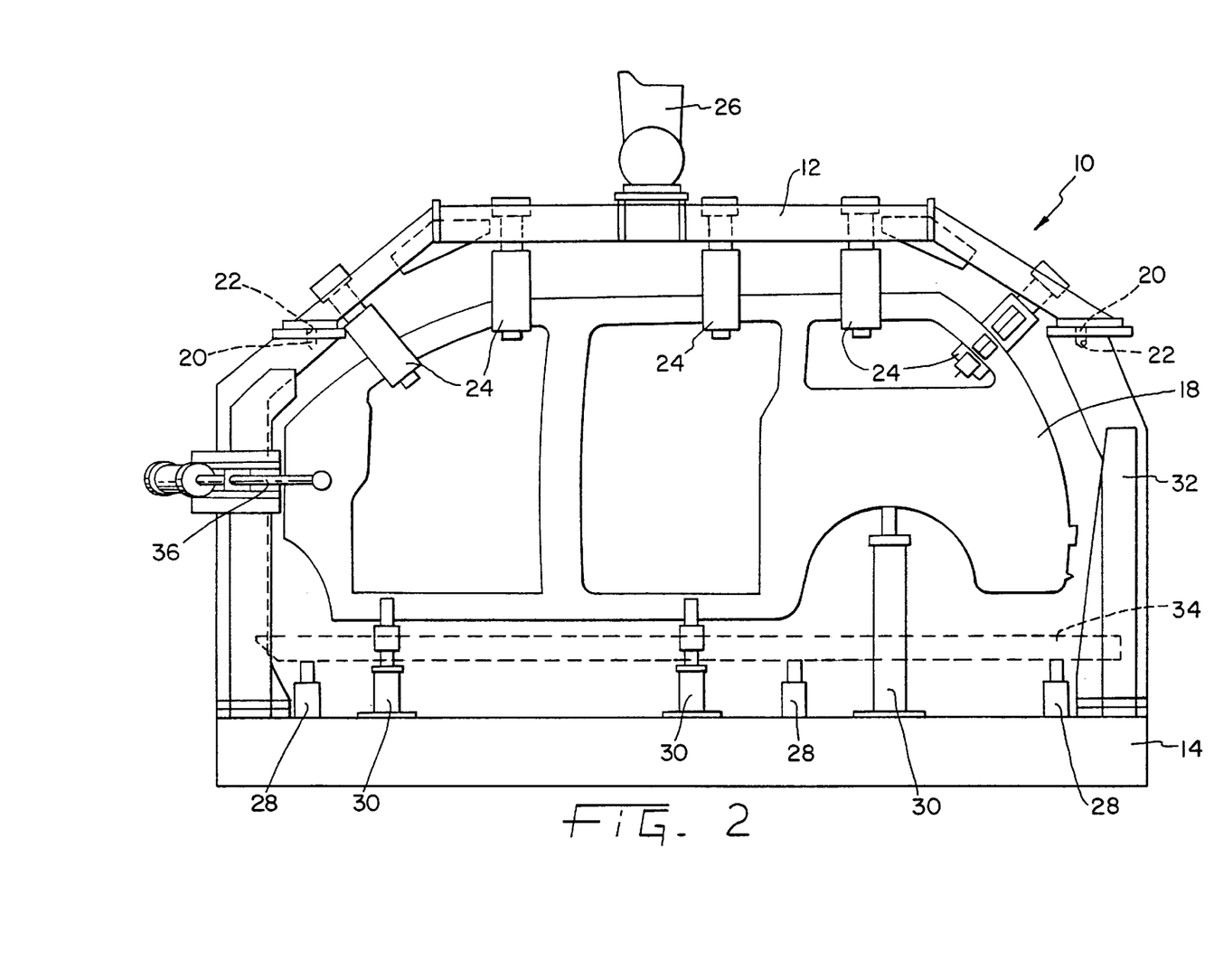
FIG. 2 is a side view of a framing device used in the framing system of this invention.
Figure 3:
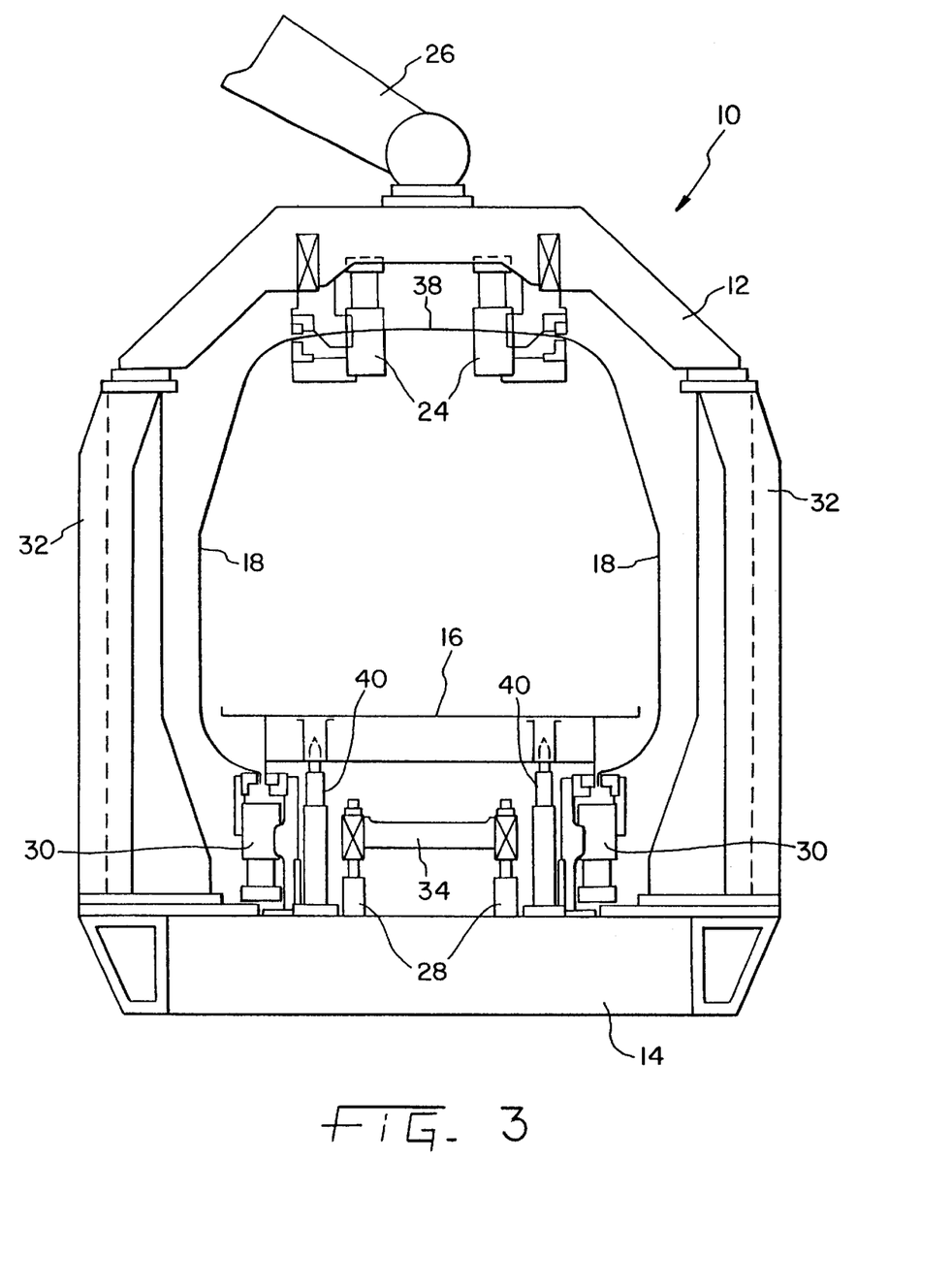
FIG. 3 is an end view of the framing device of FIG. 2.

With reference to FIGS. 1 through 3, there is shown a framing system and a framing device 10 for assembling and welding an automobile body, or body-in-white. In FIGS. 2 and 3, the body-in-white is represented by an underbody 16, a pair of side frames 18, and a number of roof bows 38. As will become apparent, the framing system of the present invention separates the framing and welding operations which are typically intermixed in prior art framing systems, such that two distinct operations are performed at dedicated work stations on the plant floor. The various advantages attributable to the framing system of this invention can beat be realized by first describing the framing device 10, illustrated in FIGS. 2 and 3.

As illustrated, the framing device 10 is a unitary frame structure within which the underbody 16, side frames 18, roof bows 38, as well as other body components, can each be supported and accurately positioned with respect to each other prior to the welding operation, which will be discussed later. In a preferred embodiment, any number of framing devices 10 will be equipped to travel on a transfer system (schematically indicated by arrows in FIG. 1) within the framing system, such that each framing device 10 sequentially follows a predetermined path through a series of stations at which various operations are performed. As is well known in the art, the framing device 10 can be equipped to travel on a closed-loop shuttle system, self-motorized to follow a defined route on the plant floor, or loaded onto a conveyor system, and then unloaded as each station is encountered. Accordingly, the transfer mechanism by which the framing device 10 is routed through the various stations does not constitute a part of this invention.

Generally, the framing device 10 includes a cart 14 which serves as the base and main support for the framing device 10. The cart 14 is generally a planar, rectangular-shaped frame which supports various lower clamps 30 and skid supports 28, as well as four upright support members 32 located approximately at the four corners of the cart 14. An upper support member 12 is supported by the cart 14 on the upper surfaces of the upright support members 32, so as to form an overstructure above the body components when they are loaded within the framing device 10. The openness of the framing device 10 furnished by the location of the upright support members 32 at only the corners of the cart 14 provides considerable access to the interior of the framing device 10. More specifically, the degree of access to the underbody 16, side frames 18 and roof bows 38 from the sides and ends of the framing device 10 permits a greater number of welds to be formed in the later welding operation. If desired, access can also be made available from above and below, the latter through openings (not shown) through the floor of the cart 14. As a result, essentially all of the welds necessary to achieve and maintain the final desired geometry of the body-in-white can be formed during a single welding operation, eliminating the requirement for a respot operation.

To permit disengagement of the upper support member 12 from the cart 14, the upright support members 32 are each provided with a locating aperture 22 for receiving a locating pin 20 projecting downwardly from each corresponding corner of the upper support member 12. Properly locating the upper support member 12 relative to the cart 14 ensures that the body components supported by the upper support member 12, for example, the side frames 18 and roof bows 38, will be accurately located relative to the underbody 16, which is supported by the cart 14.

In the use of the framing device 10, an underbody 16 will typically be delivered to the cart 14 on a skid 34, shown with phantom lines in FIG. 2. The skid supports 28 are provided on the cart 14 such that the skid 34 will remain properly supported and positioned on the cart 14 after the underbody 16 has been lifted off the skid 34 (the underbody 16 is not shown in FIG. 2 to promote the clarity of this view). The underbody 16 is located and supported with preferably three or more lower clamps 30 mounted to the cart 14. The upper support member 12 is provided with upper clamps 24 which serve to locate and support the side frames 18 and roof bows 38 relative to the underbody 16. In the process of loading the side frames 18 onto the framing device 10, the positioning of the side frames 18 is assisted by pivotable pins 36 (one of which is shown in FIG. 2) that serve to laterally locate a corresponding one of the side frames 18. In doing so, the side frames 18 are brought into alignment with the underbody 16, permitting both the lower edge of the side frames 18 and the underbody 16 to be clamped together with the lower clamps 30 mounted on the cart 14. As a result, the side frames 18 and the underbody 16 are secured in their net positions for welding.

The upper clamps 24 are shown in FIG. 2 as being spaced apart along the length of the upper support member 12. As with the placement of the upright support members 32, the limited placement of the upper clamps 24 along the periphery of each side frame 18 promotes greater access to the side frames 18 by welding guns during the welding operation. Essentially, the only regions of the side frames 18 which are not accessible to a welding gun are those regions gripped by one of the upper clamps 24 or lower clamps 30.

In FIG. 3, the upper clamps 24 are shown as facing laterally outward from the interior of the framing device 10. With this orientation, even greater access to the side frames 18 is possible. As shown, the upper clamps 24 are able to secure the side frames 18, as well as a corresponding number of roof bows 38, through the "roof" of the body-in-white. Where a roof (not shown) is installed instead of the roof bows 38, this configuration is not possible, and the upper clamps 24 must secure the side frames 18 and roof from the exterior of the body-in-white, as shown by FIG. 2.

As is apparent from FIG. 3, clearance will often not be available between the body-in-white and the upper support member 12 for removal of the body-in-white at the completion of the assembly process. Accordingly, through the cooperation of the locating pins 20 and locating apertures 22, the upper support member 12 can be lifted off the upright support members 32 to provide sufficient clearance between the body-in-white and the upper clamps 24 to permit the body-in-white to be off-loaded from the framing device 10. Shown in FIGS. 2 and 3 is an arm 26 by which the upper support member 12 can be lifted for this purpose.

Referring now to FIG. 1, the implementation of the framing device 10 of FIGS. 2 and 3 within the framing system of this invention will now be described. FIG. 1 schematically illustrates a floor plan which is made possible by the framing system of this invention. However, numerous floor plans are also possible with the framing system of this invention, and could be readily adopted by those skilled in the art. Primarily then, the floor plan shown in FIG. 1 is intended to illustrate some of the advantages which are made possible through the adoption of the is framing system of this invention. Those skilled in the art will recognize the significant advantages of performing a single welding operation in the assembly of a body-in-white, as a result of toy tab and respot welding operations being eliminated from the process. Other advantages, such as the separation of the welding and framing operations, flexibility of the framing system, optimization of cycle times, and reduced complexity of the operations and tooling employed, will become more apparent as the framing system of this invention is described.

For the following description, the route by which the framing device 10 travels through the framing system is indicated by arrows in FIG. 1. At the initiation of an assembly cycle, an underbody 16 (not shown in FIG. 1) will be loaded onto the framing device 10 at the Underbody Loading Station. Preferably, the position of the underbody 16 on the cart 14 is determined by two or more underbody locators 40, shown in FIG. 3. In one embodiment, the skid supports 28 are retractable so as to lower the underbody 16 onto the underbody locators 40, forcing the underbody locators 40 to center themselves within precision datum holes in the underbody 16. As a result, the underbody 16 is precisely located and supported on the cart 14, with a lower edge of the underbody 16 being located between the jaws of the lower clamps 30.

From the Underbody Loading Station, the framing device 10 and the underbody 16 supported thereon will be transported by a suitable transfer system (not shown) to the Side Frame Loading Station, which is preferably adjacent the Underbody Loading Station, as depicted in FIG. 1. At the Side Frame Loading Station, the side frames 18, as well as other body components such as front and rear headers, rear end panel, rear shelf, etc., are loaded onto the framing device 10. As shown in FIG. 1, these components are delivered to the Side Frame Loading Station with a pair of overhead delivery systems 42, though it is foreseeable that any number of overhead delivery systems 42 could be employed as necessary. The side frames 18 are delivered to the Side Frame Loading Station in accordance with the particular body style being assembled with the particular underbody 16 loaded on the framing device 10. The side frames 18 may be loaded by a robot (not shown) or manually, as circumstances dictate. At the Side Frame Loading Station, a pair of robots 44 are shown for the purpose of loading the left and right side frames 18 onto the framing device 10. As noted above, the lateral positioning of the side frames 18 is assisted by the pivotable pins 36 located on both sides of the framing device 10.

With reference to FIGS. 2 and 3, the side frames 18 are loaded such that the upper clamps 24 and lower clamps 30 firmly secure the side frames 18 within the framing device 10. It will typically be preferable to delay engaging one or more of the upper clamps 24 until the roof bows,38 (or roof) are loaded at the next station. In this event, the placement and number of upper clamps 24 on the framing device 10 would be preselected by one implementing the teachings of this invention so as to afford adequate support of the side frames 18 with the remaining upper clamps 24. In effect, because the upper support member 12 and the cart 14 are located relative to each other, and because the underbody 16 is located accurately on the cart 14, the side frames 18 are located accurately in relation to the underbody 16 when loaded onto the framing device 10. In particular, the lower edges of the side frames 18 are each aligned and simultaneously clamped with the underbody 16 using one or more of the lower clamps 30, as shown in FIG. 3. Accordingly, the net positions of the side frames 18 and underbody 16 are established and will be maintained by the framing device 10 during subsequent processing. Because the structure of the framing device 10 allows considerable access to the underbody 16 and side frames 18 while supported within the framing device 10, their net positions can be readily confirmed using known verification methods.

From the Side Frame Loading Station, the framing device 10 continues to the Roof Loading Station, at which point roof bows 38 or, alternatively, a roof is loaded onto the framing device 10. As illustrated, roof bows 38 are stored at the Roof Storing Station 48 adjacent the Roof Loading Station. Either manually or through the use of robots (not shown), the roof bows 38 are placed on a rack in sequence with the particular body style being assembled. A robot 46 is shown by which the roof bows 38 are then loaded onto the framing device 10. As shown in FIG. 3, the roof bows 38 are secured within the framing device 10 with an appropriate number of the upper clamps 24 such that each of the roof bows 38 is secured with a portion of the upper edge of each side frame 18. Again, because the structure of the framing device 10 allows considerable access to the body components, the net positions of the roof bows 38 can be verified before the framing device 10 proceeds to the next station.

From the Roof Loading Station, the framing device 10 continues to the Framing Station. While this station is referred to as a Framing Station, in essence, framing has already been achieved at the Side Frame and Roof Loading Stations, in that the final net positions between the body components of the body-in-white have already been determined. The welding operation performed at the Framing Station makes permanent the net positions established by the framing device 10 of this invention. Accordingly, the welding operation is entirely separate from the framing operation, and greater access to the body-in-white is made possible as a result of the elimination of the automated gate fixtures and gate fixture delivery systems required at a conventional framing/welding station.

As illustrated in FIG. 1, two alternate routes to two different Framing Stations are provided for the framing device 10. This approach allows at least two different body styles to be assembled on the same assembly line, so as to enhance the flexibility of the framing system of this invention. It is foreseeable that more Framing Stations could be employed, though only a single Framing Station may be suitable under less demanding conditions. Cycle times are also a factor in the number of Framing Stations employed. It is a significant advantage of this invention that, by eliminating the toy tab and respot welding operations conventionally required by other framing systems, additional cycle time is available for the welding operation at the Framing Stations. Furthermore, because the framing device 10 of this invention permits greater access to the body-in-white during the welding operation, a greater number of welds can be formed during a given length of time. Each of these factors will affect the optimum cycle time attainable by the framing system of this invention, as well as the number of Framing Stations employed.

As shown, robots 50 supporting a like number of welding guns (not shown) perform the welding operations at the Framing Stations. The robots 50 are programmed to appropriately locate the welds in accordance with the particular body style being assembled at any given moment. Again, because the framing device 10 of this invention significantly enhances access to the body-in-white and eliminates the need for the use of automated gate fixtures, a greater number of robots 50 can be employed at the Framing Station. Furthermore, placement of the welds during this operation is limited only by the placement of the upper and lower clamps 24 and 30 which support the body-in-white within the framing device 10. As a result, substantially all of the welds necessary to establish the desired final geometry of the body-in-white can be formed at the Framing Station, such that the body-in-white is structurally rigid at the completion of the welding operation at the Framing Station.

Upon leaving the Framing Station, the framing device 10 is delivered to an Unloading Station, at which the body-in-white is off-loaded from the cart 14 with the skid 34. As noted above, it will often be necessary to raise the upper support member 12 with the arm 26 at the Unloading Station, in order to provide sufficient clearance between the body-in-white and the upper support member 12 for unloading of the body-in-white. Unloading and loading can be from the same end of the framing device 10.

As is apparent from the above, a significant advantage of the framing system and framing device of the present invention is that the number of separate operations required to assemble a body-in-white is significantly reduced. In particular, the toy tabbing and respot operations required with conventional framing systems are completely eliminated, such that the stations required to complete these operations are eliminated from the manufacturing floor. The body-in-white is framed primarily at the Underbody and Side Frame Loading Stations, which are completely separate from the Framing Station at which the welding operation occurs. Consequently, a larger proportion of the overall cycle time can be dedicated to the welding operation, which substantially reduces, if not eliminates, the need to perform respot welding afterwards. Accordingly, successive welding operations characteristic of prior art framing systems are not required within the framing system of this invention.

In addition, because the net positions of the body components are established prior to the welding operation, the framing system of this invention permits the body-in-white to be inspected for proper placement of the components before a weld is ever made. The greater access to the body-in-white afforded by the framing device 10 facilitates this advantageous feature. After framing, greater access to the body-in-white enables more welding robots 50 to be used, such that essentially all of the welds necessary to maintain the rigidity and geometry of the body-in-white can be formed in a single operation. Greater access also corresponds to simplified maintenance, repairs, and tooling of the framing system and, therefore, potentially less downtime.

Another significant advantage of this invention is that the use of automated gate fixtures is eliminated, resulting in significantly improved access to the body-in-white by the welding guns and their associated welding robots 50. By eliminating the use of gate fixtures, the potential for match boxing is also eliminated. In addition, the transfer systems conventionally required to selectively retrieve and return the gate fixtures in order to assemble different body styles on the same assembly line are also eliminated. As a result, the complexity of the Framing Station is significantly reduced, which promotes the maintainability of the framing system. Furthermore, the welding robots 50 need not be programmed to accommodate different gate fixtures, but can be programmed off-line based on the known configuration of the framing device 10 and the known locations for the upper and lower clamps 24 and 30 for a given body style.

In addition, the advantages of the framing system can be realized while maintaining a first in-first out assembly operation, using a framing device 10 which promotes flexibility, efficiency, and economy by being readily adaptable to different body styles, including prototype body styles, without having a significant effect on the assembly process.

While the invention has been described in terms of a preferred embodiment, it is apparent that other forms could be adopted by one skilled in the art. For example, the specific framework and structure of the framing device 10 shown in FIGS. 2 and 3 could be modified by one skilled in the art, the types and positions of the upper and lower clamps 24 and 30 could be significantly altered from that shown, and the floor layout of the framing system shown in FIG. 1 could be substantially rearranged or modified to incorporate additional operations and assembly stations. Accordingly, the scope of the invention La to be limited only by the following claims.

What is claimed is:

1. A mobile framing device for net locating and supporting individual body components of a vehicle in an accurate oriented fixed position to each other so as to permit transport of said body components mounted in said mobile framing device for further processing, said mobile framing device comprising:

means for supporting an underbody component of said vehicle;

first means coupled with said underbody support means for establishing a predetermined net location for said underbody component on said underbody support means;

means, selectively engageable with said underbody support means, for supporting and net locating a plurality of individual upper body components of said vehicle, said support and net locating means being engageable with said underbody support means so as to define a unitary mobile frame structure for net locating said underbody component and said plurality of individual upper body components of said vehicle with respect to each other on said mobile framing device;

means for locating said support and net locating means in relation to said underbody support means so as to locate said plurality of individual upper body components relative to said underbody component, said locating means further comprising means for clamping each of said plurality of individual upper body components at said predetermined net location so as to establish an accurate final position of said plurality of individual upper body components with respect to said underbody component on said mobile framing device; and second clamping means mounted to said underbody support means for securing said underbody component at said predetermined net location whereby said mobile framing device may be transported between work stations while said underbody component and said plurality of individual upper body components are maintained at said predetermined net location;

whereby said unitary mobile frame structure provides a net location for each of said plurality of individual upper body components in relation to said net location of said underbody component of said vehicle so as to establish a final accurate net location of all said components which is movable between work stations to perform work on said vehicle.

2. The mobile framing device of claim 1 wherein said underbody support means has a plurality of substantially upright support members which define unobstructed openings for permitting access to said plurality of individual upper body components and said underbody component while supported within said unitary mobile frame structure.

3. The mobile framing device of claim 2 wherein said support and net locating means structurally interconnects said plurality of substantially upright support members so as to form an overstructure above said plurality of individual upper body components when supported by said support and net locating means within said unitary mobile frame structure.

4. The mobile framing device of claim 1 further comprising means associated with said underbody support means for selectively raising and lowering said underbody component.

5. The mobile framing device of claim 1 further comprising means mounted to said underbody support means for loading and unloading said underbody component to and from said underbody support means.

6. The mobile framing device of claim 1 further comprising means mounted to said support and net locating means for laterally positioning said plurality of individual upper body components within said unitary mobile frame structure.

7. The mobile framing device of claim 1 further comprising a plurality of underbody support means and a plurality of support and net locating means, each of said plurality of support and net locating means being selectively and interchangeably engagable with at least one of said plurality of underbody support means so as to form said mobile framing device.

8. The mobile framing device of claim 1 wherein said means for locating said support and net locating means in relation to said underbody support means comprises a plurality of projections extending downwardly from said support and net locating means and a corresponding plurality of apertures in said underbody support means for receiving said plurality of projections.

9. The mobile framing device of claim 1 wherein said underbody component is a floor pan of a vehicle.

10. The mobile framing device of claim 9 wherein said plurality of individual upper body components comprises a pair of side frames and front and rear headers which span between said pair of side frames.

11. The mobile framing device of claim 1 wherein said plurality of individual upper body components comprises a pair of side frames and front and rear headers which span between said pair of Bide frames.

12. The mobile framing device as claimed in claim 1, wherein said underbody support means, said first means for establishing a predetermined net location, and said support and net locating means together comprise:

a frame comprising:
a lower support member; and
an upper support member mounted on said lower support member;
said upper and lower support members being adapted to assemble said individual body components together.

13. A mobile framing device as claimed in claim 12, further comprising:

means for loading and positionally locating said underbody component of said vehicle in said lower support member; and means for loading and positionally locating, physically separate from said underbody component, at least one of said plurality of individual upper body components into said upper support member after said upper support member has been positioned on said lower support member so as to establish a predetermined geometry of said vehicle.

14. An apparatus for assembling body components of a body-in-white vehicle to form a unitary body in a single framing station, said apparatus comprising:

a frame including a lower support member positionable at said single framing station and an upper support member positionable at said single framing station, said upper and lower support members used to assemble said unitary body in said single framing station;

means for positionally locating said upper support member on said lower support member;

means for loading and positionally locating an underbody member of said vehicle in said lower support member;

means for loading and positionally locating, physically separate from said underbody member, at least one upper body member into said upper support member after said upper support member has been positioned on said lower support member so as to establish a predetermined geometry of said unitary body; and means for securing said upper body member to said underbody member so as to form and maintain said unitary body, such that access to said upper body member and said underbody member is enhanced and said frame is transportable while continuously maintaining said predetermined geometry of said unitary body.

* * * * *